UNITED STATES PATENT OFFICE.

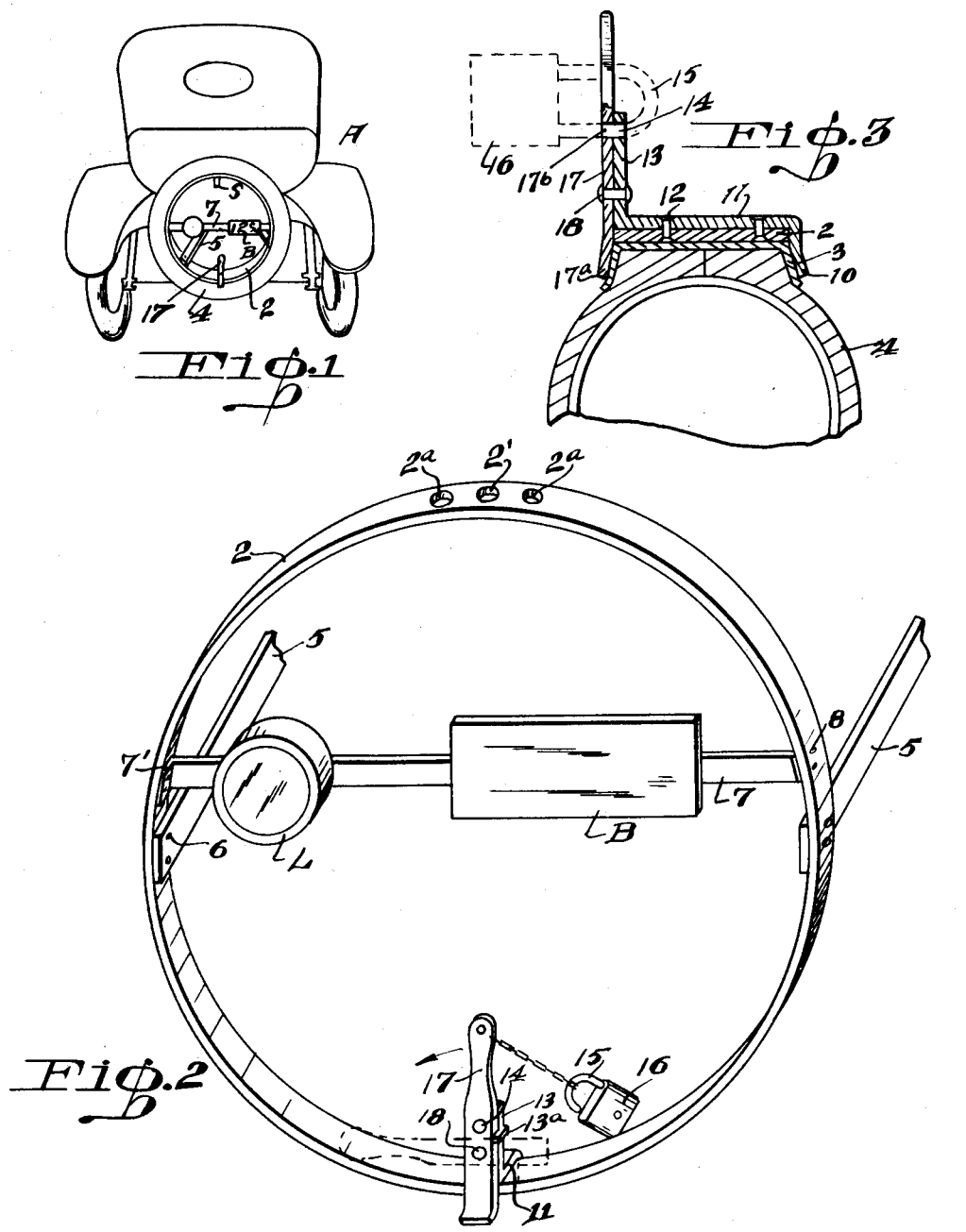

HARRY WALKER, OF ANAHEIM, CALIFORNIA.

TIRE-CARRIER-LOCKING DEVICE.

1,384,982. Specification of Letters Patent. Patented July 19, 1921.

Application filed February 16, 1920. Serial No. 359,087.

*To all whom it may concern:*

Be it known that I, HARRY WALKER, a citizen of the United States, residing at Anaheim, in the county of Orange and State of California, have invented new and useful Improvements in Tire-Carrier-Locking Devices, of which the following is a specification.

This invention relates to appurtenances to automobiles and has for its object to provide a simple, substantial, inexpensive and readily applied tire and rim rack for holding demountable rims, as for instance on the rear of an automobile, and to provide for the locking of the rack and rim mounted thereon so as to prevent the unwarranted re-removal of a rim and tire.

The invention consists of the construction and combination, and in details and arrangements of the parts, an embodiment of which invention is illustrated in the accompanying drawings and described and claimed hereinafter.

Figure 1 is a perspective of the rear end of an automobile to which the improved rack is applied and shown as carrying a tire and rim.

Fig. 2 is a detail perspective view of the improved rim rack detached from the vehicle body.

Fig. 3 is a transverse sectional view through the rim rack and its lock and applied rim and tire.

The invention embodies a ring or annulus 2 substantially in the form of a hoop corresponding in diameter to the diameter of a given automobile detachable wheel rim 3 shown in cross section in Fig. 3 and on which wheel rim there is provided a tire 4. The rack ring 2 is adapted to be suitably connected to the rear end or any other convenient portion of an automobile, indicated at A, Fig. 1, as by bracket arms 5—5, the outer ends of which may be riveted or otherwise secured, as at 6, to the inner surface thereof and at diametrically opposite points. The ring 2 may be provided with a transversely extending bracing member 7 riveted, as at 8, or otherwise secured to the opposite sides of the rack 2. This brace bar 7 may be utilized as a support for a license number plate B and may also be utilized to carry a tail light L. The outer ends of the brace bar 7 are shown bent angularly as at 7' to abut against the inner surface of the rack ring 2, through which are passed securing rivets 8.

In order to facilitate the application of a rim 3 with its tire 4 to the rack ring 2 the latter is provided at its upper portion with a valve stem receiving socket or aperture 2' into which the usual threaded stem of the tire may be inserted, and on either side of this aperture 2' are formed other recesses or apertures 2ª to receive contiguous fastening or other parts commonly found on opposite sides of the tire stem; said stem being indicated at S in Fig. 1. Having arranged the stem S so as to extend into the aperture 2' the rim 3 may then be readily slipped about the rack ring or hoop 2 and its lower portion will abut against a stop 10, provided in this case as by bending down one end of a piece of strap iron 11 that is riveted as at 12 or otherwise secured to the inner surface of the rack ring 2. The front end of this strap portion 11 is provided with an up-turned tongue 13 having adjacent its outer end an aperture 14 to receive the shackle 15 of a padlock 16. On the front of the tongue 13 there is placed a lever or dog 17 that is turnable on a pivot 18, in the tongue 13, from a perpendicular position shown in Figs. 2 and 3, so as to remove its lower locking portion 17ª from a position overlapping the adjacent portion of the demountable rim, such position being indicated in dotted lines in Fig. 2.

The lever 17 is provided with an aperture 17ᵇ to be registered with the aperture 14 in the tongue 13 so that after the rim 3 with the tire 4 has been applied to the rack 2 the lever 17 can be set with its locking dog or lug 17ª in effective position to prevent the withdrawal of the rim 3 and at which time the shackle 15 of the lock can be passed through the register holes 14 and 17ᵇ and the parts thus held in locked relation until the proper key is applied to the lock 16.

The lever 17 is limited in its movement to its locking position by a suitable device, such, for instance, as a lug 13ª provided on the tongue 13 at a suitable position with relation to the pivot 18.

From the above it will be seen that I have provided a device that is very simple and is inexpensive, and that can be readily applied to any given machine and to and from which the rims may be applied and removed with facility, and also securely locked when applied.

It is obvious that various changes may be made without departing from the spirit of the invention as claimed.

What is claimed is:

The herein described automobile tire carrier and lock comprising a ring, a strap transversely arranged upon the inner face of said ring and rigidly fastened thereto, the inner end of said strap terminating in an outwardly turned flange that overlies and extends beyond the inner edge of the ring, the inner end of said strap terminating in an inwardly projecting tongue, the outer face of which lies in the same plane with the outer edge of the ring, a locking lever fulcrumed upon said tongue and arranged on the outer face thereof, said tongue and lever being provided with perforations that are adapted to register when the lever is shifted into a position coincident with said tongue, the outer end of said lever being adapted to extend beyond the periphery of the ring when said lever is in alinement with said tongue, a stop projecting outwardly from the tongue to limit the swinging movement of the lever in one direction and means having a part adapted to pass through the perforations in the tongue and lever to lock said parts to each other.

In testimony whereof I have signed my name to this specification.

HARRY WALKER.